Nov. 8, 1938.   A. L. HOLVEN   2,135,513
APPARATUS FOR CONTROLLING THE CONCENTRATION OF BOILING SOLUTIONS
Filed May 25, 1936   2 Sheets-Sheet 1
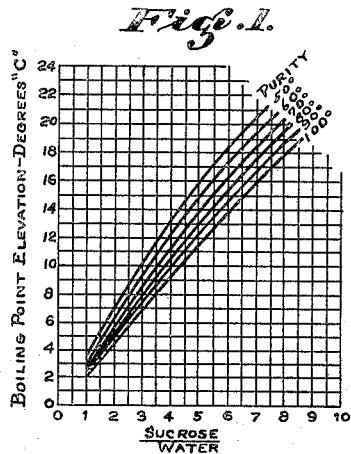
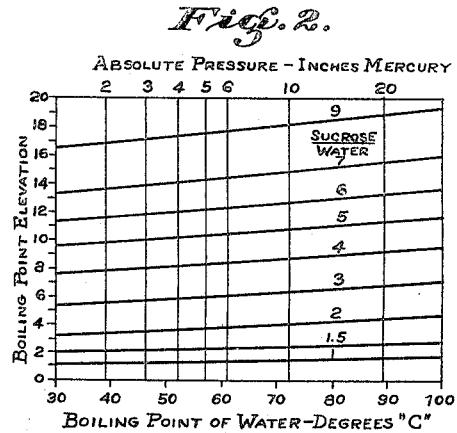
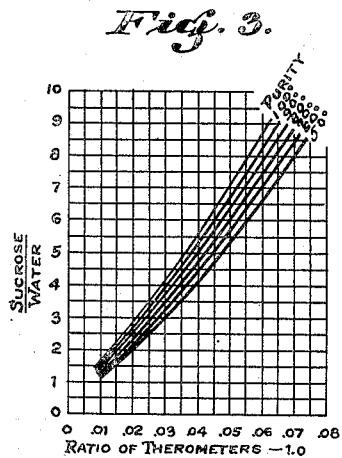
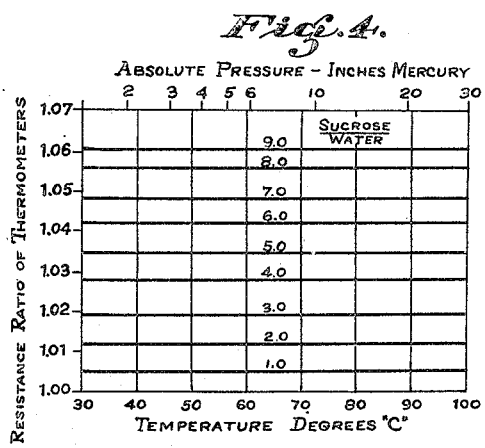
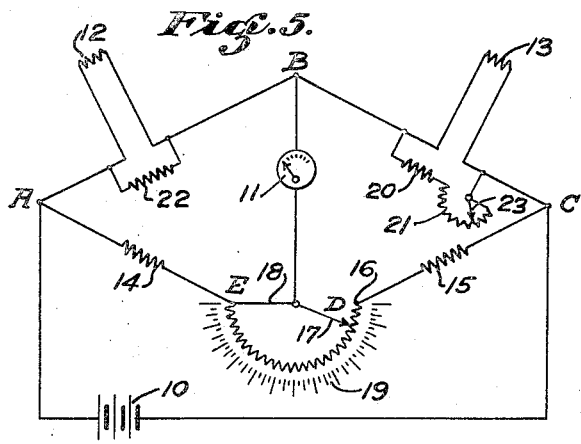
INVENTOR.
Alfred L. Holven
BY
ATTORNEY.

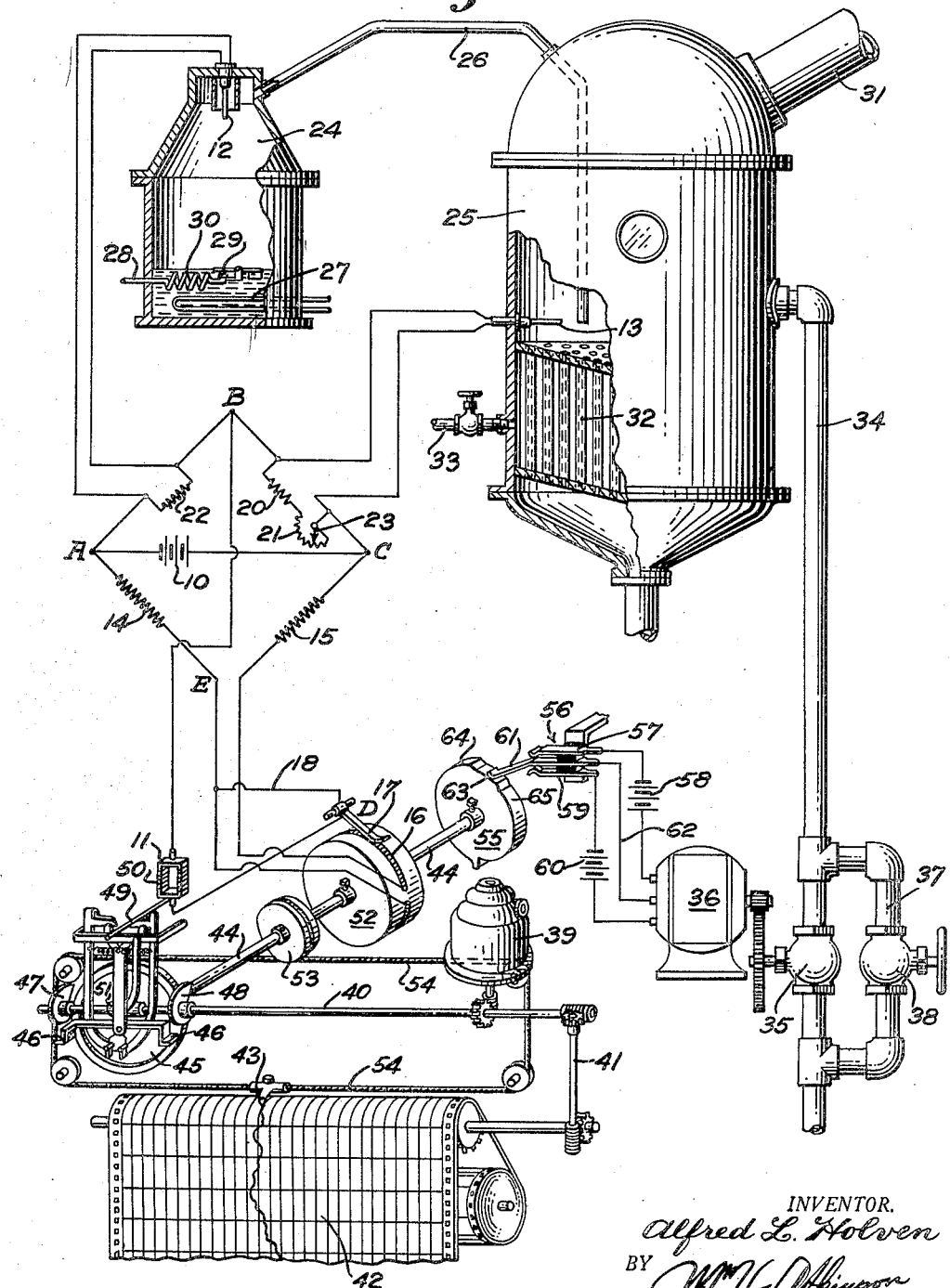

Patented Nov. 8, 1938

2,135,513

UNITED STATES PATENT OFFICE 2,135,513

APPARATUS FOR CONTROLLING THE CONCENTRATION OF BOILING SOLUTIONS

Alfred L. Holven, Crockett, Calif.

Application May 25, 1936, Serial No. 81,678

19 Claims. (Cl. 159—44)

This invention relates to an apparatus for effecting a control of the concentration of solutions being concentrated in evaporators and for recording the variations in concentration effected by the control.

In many industrial processes an accurate control of the concentration of total solids in solutions undergoing evaporation is of the utmost importance. It is therefore an object of this invention to provide an automatically controlled apparatus for obtaining any desired degree of concentration in a solution undergoing evaporation.

Another object of my invention is to produce a recording and a concentration controlling means in which the effects caused by variations in the absolute pressure and the purity of the solution being concentrated are compensated for in a new and novel manner.

In the following description it will be assumed that sugar liquors are the products to be handled. No substantial change, however, would be required either in the apparatus or in its mode of operation should it be desired to adapt the invention to conditions prevailing in the handling of other products having properties similar to those of sugar solutions.

I have discovered that the ratio of the resistances of two thermally responsive elements whose resistances are characteristic of the temperature of the boiling solution and the boiling solvent respectively, yields a result which is accurately representative of the concentration of the boiling solution irrespective of any and all variations in the absolute pressure under which the boiling occurs.

The fact that it is the ratio rather than the difference between the two resistances which the invention contemplates as a basis of measurement of concentration is particularly emphasized. As measured by this invention, said ratio is characteristic of the concentration irrespective of boiling pressure. This is a result which cannot be achieved by a measurement of the difference between two such thermally responsive elements in the manner disclosed by the prior art.

Attempts to use boiling point elevations as a means of determining the degree of concentration of boiling sugar solutions are old and well known to the art. Therefore in order to point out more clearly the difference between earlier developments and the present invention, a brief review of the prior art is desirable.

The first of such instruments was the Brasmoscope, by means of which the vacuum and the temperature of a boiling solution could be simultaneously determined and the boiling point elevation could be calculated therefrom. A direct determination of the boiling point without the necessity of calculations became the object of German Patent No. 210,543, issued to Langen in 1909. In the Langen device one thermocouple immersed in the boiling sugar solution was opposingly connected to another thermocouple, whose developed potential is representative of water boiling at the same absolute pressure. In this manner the potential difference between the two thermocouples is read as a direct measure of the boiling point elevation. Another more recent invention in this art is that covered by United States Patent No. 1,948,052, issued to Walter E. Smith in February 20, 1934. The apparatus disclosed in this latter patent differs primarily from that disclosed in the Langen patent in the substitution of resistance thermometers for thermocouples. It may therefore be pointed out that in all of the prior art, as illustrated by the above examples, the inventors have relied upon a direct measure of the boiling point elevations for estimating the concentrations of boiling solutions. These measurements of concentrations, however, as indicated by boiling point elevations, have not been sufficiently accurate to meet many of the demands of actual practice. The reason for these inaccuracies in the results given by such instruments have not been heretofore recognized.

As a result of intensive study of this problem, it has been found that the above inaccuracies are due to the fact that, for example, in sugar liquors the boiling point elevations are greatly affected by variations in the absolute pressure under which boiling takes place, and therefore the results obtained are not accurately representative of concentrations, except when all determinations are made under a constant and uniform absolute pressure. In other words, the influence of absolute pressure on the boiling point elevation of a sugar solution is so great that if disregarded it may make an error as great as 20% in the measured concentration of the solute per unit of solvent. In view of these facts, it will be seen that instruments whose results are based merely on a measure of boiling point elevation cannot be used when highly accurate results are desired.

As distinguished from the prior art, the present invention is not based upon a measure of the temperature difference, that is, the boiling point elevation, as contemplated by the prior art, but is instead based on a measure of the ratio between two resistances, one of which is a function of the boiling temperature of the sugar solution, and the other of which is a function of the boiling temperature of water at the same absolute pressure. The control of the concentrating apparatus in response to the ratio between two resistances as determined by the circuit disclosed, wherein the measurement of resistance ratios rather than resistance differences are employed, provides apparatus and a system of control which will give accurate results irrespective of any and all variations in the absolute pressure.

The distinction between the present invention, which is based upon the ratio between two resistances, and the prior art methods, which are based upon the boiling point elevations, may be mathematically illustrated by the following:

If it is assumed that $Rs$ represents the value produced by a resistance thermometer immersed in the boiling solution, and $Rw$ represents the value produced by a similar resistance thermometer immersed in water or other solvent boiling at the same absolute pressure, the final determination of concentration will be mathematically based upon the expression $$\frac{Rs}{Rw}$$

whereas in accordance with the prior art methods the results obtained are mathematically based on the expression $Rs - Rw$.

Further distinctions and advantages of the invention will be evident from the following description taken in connection with the accompanying drawings, in which there is shown by way of illustration and not of limitation, preferred embodiments thereof.

In the drawings:

Figure 1 is a chart showing the boiling point elevations, at a pressure equivalent to thirty inches (30") mercury, of sugar solutions of various concentrations and purities, Figure 2 is a chart showing the extent to which the boiling point elevation of sugar solutions is affected by variations in the absolute pressure, Figure 3 graphically illustrates the resistance ratios corresponding to various concentrations, with two copper thermometers used in accordance with the invention, Figure 4 is a chart similar to that of Figure 2, based upon the present invention. This chart illustrates the fact that the absolute pressure throughout the boiling temperature range has no effect upon the ratio between the resistance values $Rs$ and $Rw$, Figure 5 illustrates one form of circuit, by means of which the resistance ratio of two resistance thermometers may be measured in accordance with this invention, and Figure 6 schematically illustrates a controller and associated circuits which operate in accordance with the present invention to indicate and maintain the desired concentration in a solution undergoing concentration.

Before proceeding with a description of the apparatus and the circuits chosen for the purpose of illustrating this invention, it is believed that a brief reference should be made to the several graphic charts appearing in the drawings.

In Figure 1 of the drawings, there is shown a graphic chart which illustrates the boiling point elevations of sugar solutions of various purities and concentrations expressed as total solids per unit of water at an absolute pressure equivalent to thirty inches (30") mercury. In this chart the boiling point elevations are plotted as ordinates against the total solids per unit of water as abscissa, and the individual curves are identified as to the respective purities of the solutions represented thereby.

Figure 2 is a graphic chart in which the boiling point elevations are plotted as ordinates against both the boiling point of water and the absolute pressure as abscissa, and the individual curves are identified by a numeral which is representative of the concentration of the solution corresponding to the respective curves. This chart very clearly illustrates the hitherto unrecognized fact that the boiling point elevations of sugar solutions are appreciably affected by the absolute pressure under which the boiling takes place. The extent to which these variations in absolute pressure affect the boiling point elevation is also clearly shown in this chart.

In the chart shown as Figure 3, the total solids per unit of water of a sugar solution are plotted as ordinates against the resistance ratio of two thermosensitive resistance units as abscissa, for solutions having different purities. The curves in this figure of the drawings correspond to the resistance ratios which have been found to represent various concentrations of solute per unit of water or solvent when two copper resistance thermometers are used, as contemplated by the present invention.

In Figure 4 of the drawings, there is shown graphically a chart in which the ratio of two resistance values are plotted as ordinates against the boiling point of water and the absolute pressure as abscissa. This chart, when compared with the chart of Figure 2, very clearly illustrates the difference between the results which are obtained by the present invention and those which are obtainable by the prior art systems which are based upon a measure of the boiling point elevation. As illustrated in this chart, the variations in absolute pressure have substantially no effect upon the resistance ratio values corresponding to the various concentrations.

In Figure 5 of the drawings, there is shown an electrical circuit, by means of which the resistance ratio measurements and the control of the apparatus in response to the concentration of the boiling solution is attained. This circuit comprises a modified Wheatstone bridge A B C D E, which is excited by a battery 10 connected to the terminals A and C thereof, and across which there is connected between the points B and E D, a galvanometer 11. Connected in the leg A B of this galvanometer circuit there is a resistance unit 12 which is adapted to be disposed in a pilot pan, as will hereinafter appear, and connected in the leg B C of the Wheatstone bridge circuit there is a similar resistance unit 13 which is adapted to be disposed within the evaporating apparatus, wherein the solution is being concentrated. In the corresponding opposite legs of the Wheatstone bridge circuit between the points A E and C D there are also provided two resistance units 14 and 15 of like and/or known values, and in series with these legs of the Wheatstone bridge circuits there is a variable resistance 16 with which a movable contact 17 corresponding with the point D of the bridge circuit is adapted to engage.

Extending from the movable contact 17 and connected with the bridge circuit at the point E there is a shunt connection 18 which modifies the Wheatstone bridge circuit so that the adjustment required by movement of the arm 17 to balance the bridge will be directly proportional to the ratio of the resistance values assumed by the thermosensitive units 12 and 13. While the variable resistance 16 is shown as connected in series with the ends of the arms A E and C D of the Wheatstone bridge circuit, it will be noted that when the movable arm 17 is in its extreme clockwise position all of the resistance 16 will be out of the bridge circuit, and that as a result of the shunt connection 18, the resistance 16 is only capable of being introduced into the arm C D of the bridge circuit. With this circuit it is possible, by providing a properly calibrated scale 19 adjacent the variable resistance 16, to read directly therefrom the ratio between the two resistance values of resistances 12 and 13 when the apparatus is in operation. In other words, when the circuit is balanced by an adjustment of the contact 17 upon the variable resistance 16, it will be possible to read from the scale 19 a value corresponding to the concentration of the solution at the particular time.

The resistance units 12 and 13 in the above described circuit are preferably formed of a metal, such as copper, nickel, platinum or other material having a substantially constant temperature coefficient of resistance throughout their range of operation. While the bridge circuit so far described may be used as indicated to determine the concentration of a solution, its use will be limited to the measurement of a solution having a definite purity. This is because the purity of a solution has a definite effect upon its boiling temperature, whereas the boiling temperature of the water in the pilot pan will not be so affected. To correct for the influence in the purity of the solution upon the resistance value produced in the bridge circuit by the resistance 13, there is connected in shunt relation with the resistance 13 a fixed resistance 20 and a variable resistance 21, and associated with the resistance 12 there is a similar shunt connected resistance 22. The shunt resistance 21 has an adjustable connection 23 by which a portion thereof can be cut out and in this manner the total resistance of this shunt circuit can be adjusted to render the system operative with solutions of different purities, as will hereinafter appear. In this arrangement the adjustment of the connection 23 will be made manually as determined by the known purity of the solution undergoing concentration. These shunt resistance units 20, 21 and 23 are of a high value, as compared with that of the resistance units 12 and 13, and the total resistance of the units 20 and 21 is substantially equal to the resistance of the unit 22. Unlike the resistance units 12 and 13, each of the other resistance units of the bridge circuit illustrated are formed of manganin or other resistance material having a substantially negligible temperature coefficient.

The process of evaporation in any industry consists in driving off superfluous water so that a diluted solution will become concentrated, and while this invention is described in connection with the sugar industry, it is to be understood that the invention is also applicable to other fields in which products having properties similar to those of sugar solutions are being evaporated. In sugar manufacturing operations the concentration of thin juices is ordinarily effected in two stages, that is, the evaporation stage during which thin juices are concentrated up to relatively high densities, which have been found to be best suited to the remaining steps of the refining processes, and the sugar boiling stage in which the sugar is converted into the crystalline state. This invention is equally applicable for controlling the concentration in either the evaporation and/or sugar boiling stages, but the description of the apparatus and its operation will be confined principally to its use in the more general phase of evaporation in which it is desired to produce continuously a concentrated sugar liquor of uniform density.

In the process of evaporation as conducted in the sugar industry, juices or dilute sugar solutions are drawn into the evaporators which may be either multiple effect or single effect, as illustrated in the drawings, and the evaporation is conducted under a vacuum. For securing uniformity of operation, it is highly desirable that the concentrated solution as discharged from the evaporator be of a substantially uniform concentration irrespective of any and all variations in the density of the incoming solution. It is therefore contemplated by the present invention to control the concentration of the solution either by regulating the rate at which thin solution is fed to the evaporating pan or by controlling the steam supply to the evaporating pan heater, to thus increase or decrease the rate of evaporation.

In Figure 6 of the drawings, the above described modified Wheatstone bridge circuit A B C D E is shown connected in operative relation with the apparatus contemplated by this invention. As here shown, the temperature responsive resistance element 12 is disposed within a pilot pan 24, and the temperature responsive resistance element 13 is disposed within an evaporating pan 25. The interior of the pilot pan 24 is connected with the interior of the vacuum pan 25 by a conduit 26, and as a result an absolute pressure corresponding to that existing within the vacuum pan 25 will be maintained within the pilot pan 24. At this point it should be noted that the conduit 26 which connects the interior of the pilot pan 24 with the interior of the evaporating pan 25 is extended down into the boiling solution to a depth corresponding to the location of the resistance unit 13. This is to compensate for the hydrostatic head on the solution in the pan 25, and results in the production of an absolute pressure within the pilot pan 24 which is equal to that existing in the evaporating pan 25 where the resistance unit 13 is located. This eliminates the possibility of an error in the readings produced by the resistances 12 and 13 as the level of the solution in the evaporating pan changes. At the bottom of the pilot pan 24 there is a suitable heating unit 27 which will provide sufficient heat to maintain a boiling temperature within the pilot pan 24. Associated with the pilot pan 24 there is also a water supply conduit 28 having a float controlled valve 29, by means of which a constant level of water is maintained within the pilot pan. As a means to preheat the water introduced through the valve 29, the conduit 28 is provided with a coiled preheating section 30.

The evaporating apparatus, as shown, is adapted to operate at a reduced pressure, and therefore it is connected by means of an exhaust conduit 31 with a condenser and/or other vacuum producing means not shown. Disposed within the evaporating pan 25 there is a suitable heating unit 32 to which steam is supplied through a conduit 33, and connecting with the interior of the pan 25 there is also a supply conduit 34 through which the solution or mother liquor to be concentrated is introduced into the evaporating pan 25. The conduit 34 has a valve 35 which is adapted to be controlled by an electric motor 36, and disposed in by-pass relation with the valve 35 there is a second conduit 37 in which there is a manually operable valve 38.

With the above described apparatus, including the valve 38, and with the circuit as illustrated in Figure 5 of the drawings, it is possible to measure and maintain any desired degree of concentration within the evaporating pan 25 by regulating the flow of mother liquor to the evaporating pan 25 through the conduit 34 by manually adjusting the point D of the Wheatstone bridge circuit upon the calibrated scale 19 at the point corresponding to the desired concentration, and then manually opening and/or closing the valve 38 to raise or lower the concentration and thus bring about a balance or null point reading upon the galvanometer 11.

While the above mode of operation may find application under some conditions, it is contemplated by the present invention to also control and maintain the concentration of the solution in an automatic manner, and to this end the Wheatstone bridge circuit is associated with an automatic Wheatstone bridge balancing and recording device of the character illustrated and described in United States patent to Leeds, No. 1,129,699, dated January 19, 1915. The bridge balancing mechanism described in this patent is old and well known to the art, and therefore a detailed description of its mode of operation is regarded as unnecessary. It will be sufficient for the purpose of the present description to state that the mechanism described by this prior patent comprises a continuously rotating constant speed motor 39 which is adapted to drive a shaft 40, and through a suitable worm gear system 41, a recording chart 42 on which the varations effected by the control are recorded by means of the tracing pen 43. Disposed at a right angle to the shaft 40 there is a second shaft 44 that has a frictional driving disc 45 with which pivotally mounted friction shoes 46 are adapted to cooperate when pressure is exerted thereupon by either one of two cams 47 and 48 which are carried by the motor driven shaft 40. The pivotally mounted friction shoes 46 are suspended upon a delicately mounted lever system that is adapted to be set in motion by a pointer or arm 49 which is moved by potential responsive winding 50 of the galvanometer 11. A cam 51 carried by the shaft 40 also operates in conjunction with the friction shoe supporting leverage system, as will be well understood from the description of this apparatus given in the above referred to Leeds patent.

In this adaptation of the above identified automatic bridge balancing device there is provided upon the shaft 44 a suitable insulating drum 52 around which the variable resistance 16 of the bridge circuit is disposed. As here shown, the slidable contact 17 is mounted in a fixed position where it will engage the variable resistance 16 in a relatively movable manner. For the purpose of controlling the movement of the tracing pen 43 upon the record chart 42, the shaft 44 is also provided with a pulley 53 around which is looped a continuous belt 54 that is connected to the tracing pen 43. With this arrangement it will be understood that the drum 52 and the variable resistance 16 mounted thereupon, will be intermittently rotated backward and forward with respect to the contact 17 as the galvanometer pointer 49 is deflected in one direction or the other in response to any unbalanced condition produced by changes in the resistance 13 of the bridge circuit A B C D E connected therewith. This rotation of the drum 52 will occur, as stated above, when the Wheatstone bridge circuit is out of balance, and it will continue until the contact 17 arrives at a point upon the variable resistance 16, where a balance will be produced in the bridge circuit.

The above describes the automatic bridge balancing features of the present invention. In addition to an automatic balancing of the bridge circuit A B C D E, the present invention also contemplates an automatic control in the flow of the mother liquor or solution to the evaporating pan 25. To accomplish this object, the shaft 44 which carries the rotatable insulating drum 52 also carries a switch operating cam 55 which cooperates with a two-way switch 56 to control the direction of rotation of the valve controlling motor 36. The upper terminal 57 of the switch 56 is connected through a battery 58 with one terminal of the motor 36, and a lower terminal 59 of the switch 56 is connected through a battery 60 with another terminal of the motor 36. The movable switch contact 61 of the switch 56 is shown as connected through a conductor 62 with a common terminal of the motor 36. In order to render the switch 56 responsive to the galvanometer balancing device, the cam 55 is provided with a neutral zone 63, at one side of which there is a contact lifting surface 64, and at the other side of which there is a contact dropping surface 65. The neutral zone and the contact lifting and dropping surfaces upon the cam 55 are so disposed that the switch 56 will be rendered inoperative when the variable resistance 16 is displaced with respect to the contact 17 to a point where the desired concentration produces a balance in the Wheatstone bridge circuit. Should the concentration of the solution within the evaporating pan 25 be of a low order, the switch 56 will control the motor 36 and cause it to close the valve 35, and in like manner, should the concentration become too high, the switch 56 will control the motor 36 and cause it to open the valve 34. In this manner, the concentration of the solution will be raised and/or lowered by introducing more thin solution or retarding the flow thereof, until the concentration of the solution within the evaporating pan 25 will produce a ratio between the resistance values of the units 12 and 13 corresponding to the concentration desired, and thus effect a balance in the Wheatstone bridge circuit. When this occurs, it will be understood that the neutral surface 63 upon the cam 55 will come to rest under the movable contact 61 of the switch 56.

For the purpose of illustrating the manner in which the method and apparatus covered by this invention operates and also to show its contrast with apparatus based on boiling point elevations, an example from actual practice will be considered. Assume that there is boiling in the evaporator 25, of Figure 6, a sugar solution of 100° purity whose concentration is to be maintained at 4.0 parts sucrose per unit of water (i. e., equivalent to 80% solids), but that for the moment this concentration has dropped to 3.0 parts sucrose per unit of water (i. e., 75% solids), and that the solution in the evaporator 25 is boiling at atmospheric pressure. From the chart shown in Figure 1, it will be found that the sugar solution will boil at a temperature of 106.8° C., and that the water in the pilot pan 24 will boil at 100° C. At the sugar solution boiling temperature of 106.8° C., the resistance unit 13 immersed therein will have a resistance value of 13.15 ohms, and the resistance of the resistance unit 12 immersed in the pilot pan will have a resistance value corresponding to the 100° C. boiling point of water of 12.89 ohms. Under these conditions the automatic bridge balancing mechanism proceeds to measure the ratio $$\frac{Rs}{Rw}$$

which in this case becomes equivalent to $$\frac{13.15}{12.89} \text{ or } 1.020.$$

Responsive to the deflection of the galvanometer pointer 49 caused by this unbalance between the resistances 12 and 13, the instrument operates to bring about a balance in the bridge circuit in the manner described in the aforementioned Leeds patent, and the galvanometer pointer 49 will not come to rest at its null point until the contact 17 rests on that point of the variable resistance 16, which indicates that the resistance ratio of the units 12 and 13 is equivalent to 1.02. At the same time the results of such measurement will be recorded upon the chart 42 by the pen 43.

Passing now to the conditions representative of the desired concentration of 4.0 parts of solids per unit of water, the boiling point of the sugar solution should be 109.3° C. Under these conditions the corresponding resistances of the units 12 and 13 are 13.25 ohms and 12.89 ohms respectively, and the ratio $$\frac{Rs}{Rw}$$

then becomes $$\frac{13.25}{12.89} \text{ or } 1.027.$$

The control problem therefore resolves itself to the fact that while the ratio of 1.027 represents the desired concentration, the solution is temporarily at a concentration represented by the ratio 1.020. At this point it will be recalled that the switch controlling cam 55 is positioned upon the shaft 44 so that the movable contact 61 of the switch 56 will be located upon the neutral zone 63 of the cam when the desired concentration obtains in the solution undergoing concentration. When the apparatus is in this condition, with the solution at a concentration of 4.0 parts solids per unit of water, as represented by the ratio 1.027, the motor 36 will remain stationary. However, when the concentration drops to the value 3.0, as assumed in the above example, the bridge balancing device will rotate the cam 55 in a counterclockwise direction, and as soon as the movable contact 61 of the switch 56 passes off the neutral zone 63 and unto the zone 65 of the cam 55, a circuit will be completed between the contact 59 and the contact 61, and thus energize the motor 36. This will cause the motor 36 to operate the valve 35 so as to close down on the flow of solution to the evaporating pan 25. This adjustment of the valve 35 will continue until the flow of the thin solution supplied through the valve 35 has been reduced a sufficient amount to cause the density of the solution in the evaporating pan 25 to be restored to 4.0 parts solids per unit of water. If, on the other hand, the solution in the evaporating pan 25 temporarily reaches too high a density, the reverse action will take place, and as a result a clockwise rotation of the cam 55 will cause the motor controlling switch 56 to operate in a reverse direction and energize the motor 36 to open the valve 35, and thus increase the flow of thin solution to the evaporating pan 25.

In the above example, it was assumed that the evaporating pan 25 was operating at atmospheric pressure. Consider now another example which shows that the same result is obtainable irrespective of any and all changes in the absolute pressure existing within the evaporating pan 25. In this example it will be assumed that the evaporating pan 25 is operating at a vacuum equivalent to two inches (2″) mercury absolute pressure. Under such a pressure the sugar solution having a concentration of 3.0 parts of sucrose per unit of water will boil at 44.0° C., and the water in the pilot pan 24 will boil at 38.5° C. The resistance of the resistance unit 13, which is representative of the temperature of the boiling sugar solution, will be 10.73 ohms, and the resistance of the resistance unit 12, which is representative of the boiling water temperature, will be 10.52 ohms. The balancing mechanism illustrated in Figure 6 of the drawings, will therefore proceed to measure the ratio $$\frac{Rs}{Rw} \text{ or } \frac{10.73}{10.52}$$

and will come to rest when the resulting ratio of 1.020 is reached.

Attention is here particularly directed to the important fact that the resistance ratio of 1.020 is representative of a concentration of 3.0 parts solids per unit of solvent irrespective of whether the evaporation is being conducted under an absolute pressure of thirty inches (30″) mercury (i. e., atmospheric pressure) or two inches (2″) mercury absolute pressure. The same would hold true for any other pressures which might be considered.

To further emphasize the fact that the present invention achieves a result which cannot be secured by instruments whose results are based primarily on boiling point elevations, consider briefly the operation of an instrument responsive to the boiling point elevation as disclosed in the prior art. When the sugar solution is boiling under an absolute pressure of thirty inches (30″) mercury, its temperature will be 106.85° C., and the temperature of the boiling water at this same absolute pressure will be 100° C. Under these conditions the prior art devices will measure merely the temperature difference between the two above values, which is 6.85° C., and therefore any adjustment of the control will be representative of the deviation of that temperature difference from the standard. Now, when the evaporator is operated under two inches (2″) mercury absolute pressure, the sugar solution at the above concentration will boil at a temperature of 44.0° C., and the water at this absolute pressure will boil at a temperature of 38.5° C., and as a result the devices, such as are disclosed by the prior art, will measure and respond to the temperature difference between these last two temperatures, which is 5.5° C. From this it will be seen that if a boiling point elevation of 6.85° C. is equivalent to a concentration of 3.0, then a boiling point elevation of 5.5° C. must be the equivalent of some lower concentration which, from Figure 1 of the drawings, may be calculated to be equivalent to a concentration of approximately 2.5. Therefore it will be obvious that with such a device, the control adjustment required of the apparatus to increase the concentration from 3.0 to the desired concentration of 4.0 will be quite a different matter than that required to increase the concentration from 2.5 to a concentration of 4.0. Such inability of the prior art devices to compensate for the effect of changes in the absolute pressure on the boiling point elevation is a shortcoming of all instruments whose results are based on this characteristic.

For the purpose of illustrating an additional feature of the present invention, consideration is now given to the conditions involved when the sugar solution being concentrated in the evaporating pan 25, at an absolute pressure of thirty inches (30") mercury, has a purity of 80° rather than a purity of 100°. As mentioned above, the boiling point of 100° purity sugar solution having a concentration of 3.0 will be 106.8° C., and the resistance of the thermosensitive unit 13 corresponding therewith will be 13.15 ohms. However, the boiling point of an 80° purity sugar solution having a concentration of 3.0 will be 108.3° C., and the resistance of the thermosensitive unit 13 at this temperature will be 13.21 ohms. Therefore unless means are provided to compensate for this influence of the purity of the solution on the boiling temperature, the results will be in error when the purity of the sugar solution is changed. It has been found that by suitably varying the resistance of the shunt circuit, which includes resistances 20 and 21 in parallel with the resistance unit 13, it is possible to compensate for changes in the purity of the solution. In the above instance, compensation for the change in the solution from 100° purity to 80° purity is obtained by moving the contact 23 along the resistance 21 sufficiently to reduce the resistance in the arm B C of the bridge circuit from 13.21 ohms to 13.15 ohms, and as a result the apparatus will thereafter function in the same manner as though it were controlling a sugar solution of 100° purity, for which it may have been calibrated.

While I have in the foregoing discussion described the application of this invention to the control of evaporation by which thin solutions and sugar liquors are converted into a more concentrated form, it may likewise be applied to the control of sugar boiling by which the solutions are concentrated further for the purpose of crystallizing sugar therefrom. In other words, since the success of sugar boiling operations is greatly dependent on maintenance of the proper degree of concentration of the mother liquor, it is obvious that this invention, as described above, may also be used in the control of sugar boiling operations as conducted in the sugar industry. For the latter application, the motor controlled valve which may be used to regulate either the flow of liquor to the vacuum pan or the steam to the heating units thereof in the manner described. In such an application of the invention, the motor circuit controlling cam 55 will be set to maintain the optimum density in the mother liquor for the sugar boiling operation.

It should be apparent from the above that there are ways in which the circuit and associated apparatus can be rearranged to operate in a different manner, which would nevertheless be in accordance with the same novel principles herein disclosed. It is therefore to be clearly understood that I do not limit myself to what is specifically shown in the drawings and described in the specifications, but desire to cover by the appended claims, all embodiments which fall within the scope thereof.

Having thus described my invention, what I claim and desire to secure by Letters Patent is:

1. A system of control for solution concentrating apparatus, comprising an evaporating pan adapted to operate at a reduced pressure, a pilot pan for boiling water at a pressure corresponding to that in the evaporating pan, temperature responsive resistance units located in the evaporating pan and in the pilot pan respectively, a resistance ratio measuring circuit in which said resistance units are connected, a galvanometer in said resistance measuring circuit, an adjustable resistance connected in said ratio measuring circuit adapted when properly adjusted to produce a balance of said galvanometer, and a calibrated scale associated with said adjustable resistor adapted to indicate the concentration of the solution in the evaporating pan when said galvanometer is in balance.

2. A system of control for solution concentrating apparatus, comprising an evaporating pan adapted to operate at a reduced pressure, a pilot pan for boiling water at a pressure corresponding to that in the evaporating pan, temperature measuring resistance units located in the evaporating pan and in the pilot pan respectively, a temperature ratio measuring circuit in which said resistance units are connected adapted to indicate the resistance ratio between said temperature measuring resistance units as a measure of the concentration of the solution in the evaporating pan, and means associated with one of said resistance units to compensate for the effect of the purity of the solution upon its measured temperature.

3. A system of control for solution concentrating apparatus, comprising an evaporating pan adapted to operate at a reduced pressure, a pilot pan for boiling water at a pressure corresponding to that in the evaporating pan, temperature responsive resistance units located in the evaporating pan and in the pilot pan respectively, a ratio measuring circuit in which said resistance units are connected adapted to indicate the resistance ratio between said units as a measure of the concentration of the solution in the evaporating pan, and an adjustable resistance connected in shunt circuit with one of said resistance units to compensate for the effect of purity upon the boiling temperature of the solution.

4. A system of control for evaporating apparatus, comprising an evaporating pan adapted to operate at a reduced pressure, a water boiling pan in which is maintained a pressure corresponding with that in the evaporating pan, thermosensitive resistance units located in the evaporating pan and in the water boiling pan respectively, an electrical circuit adapted to measure and indicate the resistance ratio of said thermosensitive resistance units, and means controlled by said electrical circuit for regulating the supply of solution to said evaporating pan to thereby maintain a desired concentration.

5. A system of control for evaporating apparatus, comprising an evaporating pan adapted to operate at a reduced pressure, a water boiling pan in which is maintained a pressure corresponding with that in the evaporating pan, thermosensitive resistance units located in the evaporating pan and in the water boiling pan respectively, a modified Wheatstone bridge circuit adapted when balanced to measure and indicate the resistance ratio of said thermosensitive resistance units, means for automatically balancing said bridge circuit, and means controlled by said bridge balancing means for regulating the supply of solution to said evaporating pan to thereby maintain a desired concentration.

6. A system of control for evaporating apparatus, comprising an evaporating pan for a solvent containing solution adapted to operate at a reduced pressure, a conduit for introducing a flow of solution to said pan during an evaporating cycle, a boiling pan for the solvent of said solution adapted to operate at a pressure corresponding to that existing in the evaporating pan, thermosensitive resistance units located in said evaporating pan and in said boiling pan, a Wheatstone bridge circuit adapted to measure and indicate the resistance ratio of said thermosensitive resistance units, and means responsive to a condition of unbalance in said bridge circuit for changing the flow of solution through said conduit to said evaporating pan to maintain a desired concentration of the solution undergoing evaporation in said evaporating pan.

7. In a system of control for evaporating and concentrating apparatus, the combination of an evaporating pan in which a solvent containing solution is evaporated adapted to operate at a reduced pressure, a pilot pan in which the solvent of said solution is boiled at a pressure corresponding to the pressure in the evaporating pan, a Wheatstone bridge circuit, two thermosensitive resistance units located one in said evaporating pan and one in said pilot pan, said thermosensitive resistance units being connected in opposite legs of said bridge circuit, a galvanometer responsive to said bridge circuit, an adjustable resistance in a third leg of said bridge circuit adapted to compensate for any unbalance produced in said bridge circuit by said thermosensitive resistance units and indicate the concentration of the solution in the evaporating pan when said bridge circuit is balanced by an adjustment of said latter resistance.

8. In a system of control for evaporating and concentrating apparatus, the combination of an evaporating pan in which a solvent containing solution is concentrated adapted to operate at a reduced pressure, means for introducing a solvent containing solution into said evaporating pan during a concentrating cycle, a pilot pan in which the solvent of said solution is boiled at a pressure corresponding to the pressure in the evaporating pan, a Wheatstone bridge circuit, two thermosensitive resistance units located one in said evaporating pan and one in said pilot pan, said thermosensitive resistance units being connected in opposite legs of said bridge circuit, a galvanometer responsive to said bridge circuit, an adjustable resistance in a third leg of said bridge circuit adapted to compensate for any unbalance produced by said thermosensitive resistance units and balance said bridge circuit, and means responsive to said galvanometer for controlling said means for introducing the solvent containing solution to said evaporating pan upon an unbalance in said bridge circuit during an operating cycle.

9. In apparatus for measuring and regulating the concentration of a solution undergoing evaporation, the combination of an evaporating pan from which the concentrated solution may be withdrawn and to which a low concentration solution is fed, a water boiling pan in which is maintained the same pressure as that in the evaporating pan, temperature responsive resistance units located respectively within the evaporating pan and within the water boiling pan, an electrical circuit for measuring the ratio between the resistances of said resistance units, and a motor actuated valve responsive to said electrical circuit for regulating the flow of low concentration solution to the evaporating pan to thus maintain a definite concentration in the solution withdrawn from said evaporating pan.

10. The combination of an evaporating pan, a motor operated valve for regulating the flow of a low concentration solution to said evaporating pan, a water boiling pan in which is maintained the same pressure as that in the evaporating pan, a thermosensitive resistance unit in said evaporating pan and in said water boiling pan, a resistance ratio measuring circuit responsive to the resistance ratio of said resistance units, and means responsive to said circuit for controlling the operation of said motor operated valve.

11. The combination of an evaporating pan, a motor actuated valve for regulating the flow of a low concentration solution to said evaporating pan, a water boiling pan in which is maintained the same pressure as that in the evaporating pan, a thermosensitive resistance unit in said evaporating pan and said water boiling pan, a resistance ratio measuring Wheatstone bridge circuit responsive to the resistance ratio of said resistance units, an automatically operating device for balancing said bridge circuit, and means operated by said bridge balancing device for controlling the operation of said motor actuated valve, whereby the concentration of the solution undergoing evaporation will be maintained substantially constant.

12. A system of control for solution concentrating apparatus, comprising an evaporating pan adapted to operate at a reduced pressure, a pilot pan for boiling water at a pressure corresponding to that in the evaporating pan, temperature responsive units located in the evaporating pan and in the pilot pan respectively, a resistance ratio measuring circuit in which said resistance units are connected, and means responsive to said measuring circuit for controlling the operation of the evaporating pan to maintain a concentration of the solution therein corresponding to the ratio between the resistance values of said resistance units.

13. A measuring circuit for evaporating apparatus of the character described, comprising a Wheatstone bridge circuit having a resistance in one leg thereof responsive to the temperature in an evaporating pan, a second resistance responsive to the boiling temperature of water at the same pressure in another leg of said bridge circuit, a variable resistance associated with one of the opposite legs of said Wheatstone bridge circuit adapted to balance the bridge circuit, and means associated with said variable resistance adapted to indicate the ratio between the resistances of said resistance units.

14. A solution concentration measuring circuit for evaporating apparatus of the character described, comprising a Wheatstone bridge circuit having a resistance in one leg thereof responsive to the temperature of the solution in an evaporating pan, a second resistance in an adjacent leg of said bridge circuit responsive to the boiling temperature of water at the same pressure, a variable resistance associated with one of the opposite legs of said Wheatstone bridge circuit adapted to balance the bridge circuit, means cooperating with said variable resistance adapted to indicate the ratio between the resistances of said resistance units as a measure of the concentration of a solution undergoing evaporation in said evaporating pan, and means for varying the effect of said first resistance upon said bridge circuit to correct for solutions of different purities.

15. In a temperature ratio measuring circuit of the character described, the combination of a temperature responsive resistance representative of the temperature of a boiling solution at different degrees of purity, a second temperature responsive resistance unit representative of the boiling temperature of water at the same absolute pressure, means for determining the ratio between the temperature of the boiling solution and the temperature of the water as measured by said temperature responsive resistances and a variable resistance unit connected in shunt with said first resistance unit to compensate for changes in purity of the solution undergoing evaporation.

16. In a control system for evaporating apparatus of the type which employs a water boiling pilot pan operating at the same absolute pressure as the evaporating apparatus as a temperature reference point, the improvement which comprises connecting the pilot pan to the evaporating apparatus at a point immediately adjacent the temperature measuring means in the evaporating apparatus, to thereby compensate for the hydrostatic head of solution in the evaporating apparatus.

17. In a control system for evaporating apparatus of the type which employs a water boiling pilot pan operating at the same absolute pressure as the evaporating apparatus as a temperature reference point, the combination of an evaporating pan, a pilot pan in which water is boiled, temperature responsive measuring means in said evaporating pan and in said pilot pan respectively, and a pressure equalizing connection between said pilot pan and a point within the evaporating pan immediately adjacent the temperature responsive measuring means.

18. In a system for measuring the concentration of a solution undergoing evaporation, the combination of an evaporating pan in which a solvent containing solution is evaporated, a pilot pan in which the solvent of said solution is boiled at the same absolute pressure as that existing within the evaporating pan, a thermosensitive resistance unit located in said evaporating pan, a second thermosensitive unit located in said pilot pan, the resistance of said thermosensitive units at the same temperature being equal in value, a Wheatstone bridge circuit in the adjacent legs of which said resistance units are connected, a variable resistance connected in series with one of the opposite legs of the Wheatstone bridge circuit for balancing said bridge circuit, a galvanometer connected between the adjacent legs of the bridge circuit and to an adjustable point upon said variable resistance of said opposite leg of the Wheatstone bridge circuit, and an indicating scale adjacent the adjustable point upon said variable resistance adapted to indicate the ratio between the resistances of the resistance unit in said evaporating pan and the resistance unit in said pilot pan when said Wheatstone bridge is in balance.

19. In a system for measuring the concentration of a solution undergoing evaporation, the combination of an evaporating pan adapted to receive a flow of diluted solution during an evaporating cycle, a pilot pan in which the diluted of said solution is boiled at the same absolute pressure as that existing within the evaporating pan, a thermosensitive resistance unit located in said evaporating pan, a second thermosensitive unit located in said pilot pan, the resistance of said thermosensitive units at the same temperature being equal in value, a Wheatstone bridge circuit in the adjacent legs of which said resistance units are connected, a resistance connected in series with one of the opposite legs of the Wheatstone bridge circuit for balancing said bridge circuit, a galvanometer connected between the adjacent legs of the bridge circuit and to a point adjustable along the resistance in series with the opposite leg of the Wheatstone bridge circuit, means for automatically adjusting the point of connection of the galvanometer along said resistance to balance said bridge circuit, and means for regulating the flow of the diluted solution to said evaporating pan to maintain a definite ratio between the resistance values of the resistance unit in said evaporating pan and the resistance unit in said pilot pan.

ALFRED L. HOLVEN.